United States Patent Office 2,921,678
Patented Jan. 19, 1960

2,921,678

NOVEL FLOTATION PROCESS

Charles H. Fuchsman, University Heights, Ohio, assignor to Columbia-Southern Chemical Corporation, Allegheny County, Pa., a corporation of Delaware No Drawing. Application February 19, 1957
Serial No. 641,024

6 Claims. (Cl. 209—166)

The present invention deals with recovery of potassium chloride from sylvinite ores or the like. It especially deals with an improved flotation process for recovering potassium chloride of commercially desirable purity from potassium chloride ores.

Described in the literature are many flotation processes designed to recover potassium chloride from the form in which it is found in nature, notably as a sylvinite ore. These flotations are of varying effectiveness, depending upon the nature of the ore and other considerations. Attempts to recover by flotation potassium chloride of purity satisfying commercial standards, e.g. of at least 95 percent purity, from sylvinite ores and the like which contain between 1 and 10 percent by weight calcium sulfate have not been fruitful. Usually, the recovered product is of subpurity and/or the recovery of potassium chloride is inefficient.

It has now been discovered that the recovery of potassium chloride of commercial purity from sylvinite ores or other potassium chloride ores containing from 1 to 10 percent calcium sulfate by weight may be achieved in a simple, expeditious manner. According to the present invention, potassium chloride of acceptable commercial purity can be recovered from sylvinite ores containing 1 to 10 percent by weight calcium sulfate by conducting the selective froth flotation of potassium chloride in an aqueous medium adjusted to an acidic pH below 4, and more preferably below pH 3.5. The recovery of potassium chloride from the ore is also high, generally upwards of 90 weight percent of the potassium chloride in the ore.

In accordance with the present invention, sylvinite ore or like potassium chloride ore containing from 1 to 10 percent calcium sulfate by weight is slurried in an aqueous medium, which has been adjusted to an acidic pH below 4 and a flotation or collection agent is added with the consequence that potassium chloride is selectively floated in the aqueous medium while it is at a pH of 4 or less. Adjustment of the pH is accomplished, for example, by adding hydrochloric acid or like acidic material.

Hydrochloric acid is the recommended acidifying agent. It offers the desirous opportunity for adjusting the pH without contaminating the system with ions other than those already present. Other acidifying agents such as sulfuric acid, sulfurous acid, sulfur dioxide, carbon dioxide and the like may however be used.

Most of the useful collection or flotation agents are chemical reagents of the cationic group. These cationic agents are the high molecular weight aliphatic amines and their water-soluble salts including the quaternary amine salts. Typical examples of such cationic flotation agents include aliphatic amines having a straight-chain alkyl group of 7 or more carbon atoms such as n-heptylamine, n-octylamine, n-nonylamine, n-decylamine, n-unidecylamine, n-dodecylamine, n-tetradecylamine, n-hexadecylamine and n-octadecylamine. Commercially available flotation agents of this type are usually the water-soluble acetate salts of a mixture of such amines. Flotation agents which are water-soluble acetate salts of these amines such as Armac TD sold by Armour and Company are especially effective in the performance of the present invention. Armac TD is understood to consist of the water-soluble acetate salts of n-hexadecyl, octadecyl and octadecenyl amines derived from tallow in the approximate weight proportions of 30, 25 and 45 parts by weight. This invention, it will be understood, includes the use of recognized flotation agents or cationic collectors other than those specifically herein enumerated.

The amount of flotation or collection agent usually ranges from 0.5 to 1.2 pounds per ton of ore in the aqueous slurry in which flotation is accomplished. Wide latitude in the quantity of flotation ore collection agent is possible. The exact state of subdivision of the slurry of sylvinite ore, the flotation or collection agent itself, and other conditions may make it advisable to employ more or less of the agent.

An additional advantage offered by this process and the control of the pH below 4 is the lowered consumption of flotation or collection agent. Significantly less flotation agent is needed to effectuate the desired froth flotation in a slurry at an acidic pH below 4 than is required with a slurry at neutrality.

In a procedure illustrative of performance of this invention, sylvinite ore containing from 1 to 10 percent calcium sulfate by weight is slurried in water. In the normal course of operation, this water is saturated with the soluble component of the sylvinite ore, such as sodium chloride and potassium chloride, and hence, flotation is accomplished in a slurry of sylvinite ore saturated with the soluble ore components. Prior to slurrying, the ore is first mechanically subdivided into small particles usually from minus 20 to plus 200 mesh. The pH of this sylvinite ore slurry is then adjusted to below 4, and more preferably is adjusted to between 1 and 3.5 pH, by the addition of a small quantity of hydrochloric acid. Once the ore slurry is at this prescribed pH, the flotation or collection agent is added. Under these conditions, selective flotation of the potassium chloride present in the sylvinite ore occurs. The froth is removed, rediluted in a solution saturated with the soluble components of the sylvinite ore undergoing treatment and aerated. A second froth appears and is collected. This second froth is usually regarded as product. Middlings, the material failing to froth in this second treatment, may be recycled to a further frothing in which fresh sylvinite ore is treated.

Thus, the present invention departs from prior techniques for recovering potassium chloride from its natural state by froth flotation in the step of adjusting the pH of the medium in which froth flotation occurs to a pH below 4. This departure and pH control has special significance in the treatment of sylvinite ores containing from 1 to 10 percent by weight calcium sulfate. Without proper pH adjustment in accordance with the herein enumerated principles, recovery by froth flotation of potassium chloride from sylvinite ores containing from 1 to 10 percent calcium sulfate by weight does not yield a sufficiently pure, commercially acceptable grade of potassium chloride. With prior practices, additional purification of potassium chloride recovered by froth flotation from sylvinite ores of the herein treated character is required. This additional purification is costly, both because additional processing is necessary and also because of further losses of potassium chloride.

Typical sylvinite ores with which the present invention is concerned are those comprised primarily of potassium chloride, sodium chloride and calcium sulfate, the latter comprising between 1 and 10 percent, or higher, by weight of the ore. Other components may be found in the ores, but for the most part are present in minor concentrations. Normally, from 20 to 50 percent by weight of the ore is potassium chloride with the balance being primarily sodium chloride except for the calcium sulfate.

The importance of adjusting the pH to below 4 in the slurry prior to froth flotation is demonstrated by these examples.

*Example*

With the following procedure, a series of froth flotations of sylvinite ore were conducted with slurries of different pH values:

A flotation cell was half filled with a saturated sodium chloride-potassium chloride solution at normal tap water temperature of about 25° C. to this was added one pound of sylvinite ore of minus 20 to plus 150 mesh, and predominantly of minus 20 to 35 mesh in size. The ore analyzed by weight as 34±2 percent potassium chloride, 2.2±0.3 percent of water insolubles the primary component of which was calcium sulfate and 64±2 percent sodium chloride. Hydrochloric acid solutions of different concentrations were added to the brine in each of the separate flotations to provide a different slurry pH. Thereafter, 3 cubic centimeters of an aqueous solution of Armac TD solution containing 5 percent by weight of flotation agent was added.

The contents in the flotation cell were slurried for 2 minutes and then the slurry aerated until a product froth appeared. Product froth was collected and refloated. This second froth was recovered and analyzed for potassium chloride purity.

When sufficiently concentrated hydrochloric acid solution was added to adjust the brine pH to 2, the product potassium chloride was 96.5 percent potassium chloride purity. With the slurry adjusted to pH 2.5, the product purity was 95.7 percent, and with the slurry adjusted to pH 3.5, a product of 95 percent purity is obtained. On the other hand, when no hydrochloric acid was added and the pH of the slurry was substantially neutral (no hydrochloric acid having been added), e.g. pH 7, the potassium chloride product recovered was but 85 percent potassium chloride by weight.

The temperature of the slurry is conveniently that of process water but of course may be any temperature which admits of a slurry, avoids freezing or boiling. Thus, slurries are usually at 10° C. to 70° C.

Although the present invention has been described by reference to specific details of certain embodiments, it is not intended that the invention be construed as limited thereto except insofar as such limitations are included in the appended claims.

What is claimed:

1. A method of recovering potassium chloride from ores thereof containing from 1 to 10 percent calcium sulfate by weight by froth flotation which comprises suspending the ore in an aqueous slurry, acidifying the slurry to a pH below 4, including a cationic froth flotation agent in the acidified slurry and effecting froth flotation.

2. A method of claim 1 wherein the pH is between 1.5 and 3.5.

3. A method of recovering potassium chloride from a potassium chloride ore containing sodium chloride and at least one percent by weight of calcium sulfate by froth flotation which comprises suspending said ore in an aqueous body, acidifying the slurry to a pH below 4, adding a cationic froth flotation agent and effecting cationic froth flotation of potassium chloride whereby to obtain a potassium chloride product of a purity higher than obtained without said acidification.

4. The method of claim 3 wherein the slurry is acidified by the addition of hydrochloric acid.

5. A method of recovering potassium chloride by froth flotation from an ore thereof which also contains at least one percent by weight of calcium sulfate, said amount normally interfering with recovery by froth flotation of high purity potassium chloride, which comprises suspending such ore in an aqueous body, acidifying the slurry by addition of an acidifying agent to a pH below 4, adding a cationic froth flotation agent, froth floating and collecting floated potassium chloride, redispersing collected potassium chloride and effecting a further froth flotation whereby to obtain potassium chloride of enhanced purity.

6. A method of recovering potassium chloride by froth flotation thereof from an ore containing from 1 to 10 percent calcium sulfate by weight, said amount of calcium sulfate interfering with the recovery of high purity potassium chloride, which comprises suspending such ore in an aqueous body, acidifying the slurry by addition of an acidifying agent to a pH below 4, adding a cationic flotation agent, froth floating and collecting floated potassium chloride, redispersing collected potassium chloride and effecting a further froth flotation whereby to obtain potassium chloride of enhanced purity.

References Cited in the file of this patent

UNITED STATES PATENTS

| | | |
|---|---|---|
| 2,633,241 | Banks | Mar. 31, 1953 |
| 2,721,657 | Smith et al. | Oct. 25, 1955 |

OTHER REFERENCES

"Concentration of the Potash Ores of Carlsbad, New Mexico, by Ore Dressing Methods." Report of Investigations—Department of Interior Bureau of Mines No. 3271 (1935).

Ralston: Bureau of Mines RI 3397, 1938, Flotation and Agglomerate Concentration of Nonmetallic Minerals, pages 15, 16.